United States Patent Office 2,972,604
Patented Feb. 21, 1961

2,972,604
CHLOROSULFONATION OF ETHYLENE POLYMERS

William B. Reynolds and Peter J. Canterino, Bartlesville, Okla., assignors to Phillips Petroleum Company, a corporation of Delaware No Drawing. Filed Sept. 10, 1956, Ser. No. 608,687

6 Claims. (Cl. 260—79.3)

This invention relates to a method of chlorosulfonating ethylene polymers and to the product of such chlorosulfonation.

While polyethylene has been chlorosulfonated in chlorinated hydrocarbon solvents, there have recently been discovered methods of preparing ethylene polymers of relatively high crystallinity and density which are not soluble in ordinary solvents at ambient temperatures or even under reflux conditions especially in those solvents useful in chlorosulfonation processes. Therefore, the known methods for chlorosulfonating polyethylene in the usual solvents are not applicable for the chlorosulfonation of these highly crystalline, high density ethylene polymers employed as the starting materials in the present invention. When the prior art method of chlorosulfonating ethylene polymers is applied to the highly crystalline polyethylenes, the products obtained are stiff, non-homogeneous plastics. However, when employing the method of the present invention, chlorosulfonated products containing chlorine even in the same range as the prior art method are produced which are strong flexible plastics as contrasted to rubbery products of the prior art. These plastics are useful both in the unvulcanized condition or they can be vulcanized and when so vulcanized they have physical properties superior to those of the prior art. In general, the prior art materials had to be vulcanized to develop suitable physical properties. These prior art ethylene polymers when chlorosulfonated are valuable in the manufacture of gaskets, colored rubbery compositions, protective coatings, monofilaments, films, rubber articles, plastic pipes, etc., however, the flexural strength is not as high as is desirable. The polyethylenes of high crystallinity and high density cannot be satisfactorily chlorosulfonated by prior art methods since the products so produced are high melting, non-homogeneous materials even in the region employed by the prior art for production of rubber-like products.

An object of this invention is to provide a method for chlorosulfonating ethylene polymers of high crystallinity and high density.

Another object of this invention is to provide a novel chlorosulfonated ethylene polymer.

Still other objects, advantages and features of this invention will be apparent to those skilled in the art having been given this disclosure.

According to this invention, an ethylene polymer having a crystallinity of at least 70 percent at room temperature as determined by nuclear magnetic resonance and a density of at least 0.94 is dissolved in solvent at high temperature and the material contacted with sufficient chlorine to solubilize the polymer even at atmospheric pressures and ambient temperatures after which the chlorosulfonation is completed. The chlorination can be carried out in a high boiling solvent or pressures can be used in conjunction with the usual chlorinating solvents. The sulfonating agent can be added along with the initial chlorine or can be added after the polymer has been solubilized. The entire reaction can be carried out at the high temperatures, or the materials can be first solubilized, cooled and then chlorosulfonated. The initial or solubilizing step is generally carried out at a temperature of at least 110° C. and preferably in the range of 110 to 130° C., however, other temperatures both higher and lower can be used so long as the polymer is solubilized.

The chlorosulfonation is generally carried out under catalytic conditions. Sunlight and artificial light, especially ultraviolet light, have been found effective in promoting the reaction. Also, catalysts such as peroxides and hydroperoxides are useful. Examples of suitable catalyst include benzoyl peroxide, diisopropylbenzene hydroperoxides, and cumene hydroperoxides. Azo compounds are also useful as catalysts. Examples of this class of catalysts include dimethyl and diethyl alpha, alpha'-azodiisobutyrate, alpha, alpha'-azo-diisobutyronitrile, and alpha, alpha'-azobis(alpha, gamma-dimethylvaleronitrile).

Properties of the chlorosulfonated polymers of this invention can be varied considerably depending upon the nature of the polymers used as starting materials, upon the chlorine content, and upon the sulfur content. The products in which there is the greatest commercial interest at present are those prepared from high molecular weight ethylene polymers in which the chlorine content is in the range of 10 and 40 weight percent and the sulfur content is in the range of 0.4 and 3 weight percent. Products prepared by the method of this invention from a given ethylene polymer and having a chlorine content in the lower portion of the range will generally be tough, flexible and leathery while those having a higher chlorine content, e.g., between 20 and 40 weight percent will be tough, flexible and elastic. It will be understood by those skilled in the art that the rubbery products of the prior art cannot be oriented as can flexible plastics. The tensile strength of the products is high and materials having exceptionally high tensile strength can be obtained by drawing at room or higher temperatures to produce orientation. Orientation in the polymer can be produced either before or after compounding and vulcanization. Cold drawn raw gum stocks having a tensile strength around 17,000 p.s.i. can be readily obtained from a high molecular weight chlorosulfonated ethylene polymer having a chlorine content of 17 weight percent and a sulfur content of 1.27 weight percent. In addition to the other good properties mentioned, the products of this invention are resistant to attack by ozone.

The chlorinating and sulfonating agents can be any known to the art, however, chlorine and sulfur dioxide are most generally employed. The chlorine is employed in molecular excess to that of the sulfur dioxide and as has been mentioned sufficient chlorine is used to obtain 10 to 40 weight percent chlorine and sufficient sulfur dioxide employed to obtain a sulfur content of between 0.4 and 3 weight percent.

Carbon tetrachloride, being fully halogenated, is the preferred solvent for use in this invention. However, other solvents can be employed which may or may not be chlorinated under the conditions employed. Other solvents which can be employed without consuming chlorine include chloroform, trichloroethane, and methylene chloride. The art is aware of suitable chlorination solvents and any such solvents can be employed in this invention. However, low boiling solvents such as those mentioned are preferred since they can be readily separated from the product. However, high boiling solvents can be employed such as tetrachloroethane and hexachloroethane. Frequently the solubilizing step will be carried out with one of these high boiling materials, the solubilized polymer recovered and the chlorosulfonation step carried out in a low boiling solvent. This is desirable since the lower chlorine-content material is more easily separated from these high boiling solvents and lesser amounts of chlorinated by-product from the solvent are obtained than if the reaction were carried out in its entirety in the high boiling solvent.

The polymers to which the present invention is applicable are polymers of ethylene having a crystallinity of at least 70 percent at room temperature and preferably at least 80 percent as determined by nuclear magnetic resonance and having a density of at least 0.94 and preferably at least 0.96. Density as used in this specification is given in grams per cc. Ethylene polymers which are applicable are homopolymers of ethylene and copolymers of ethylene with minor amounts of other 1-olefins of up to 8 carbon atoms per mlecule, and also with conjugated dienes of up to 8 carbon atoms per molecule. Examples of suitable comonomers include propylene, 1-butene, 1-pentene, 1-hexene, 1-octane, 4-methyl-1-pentene, 4-methyl-1-hexene, 3-ethyl-1-hexene, 6-methyl-1-heptene, 5-methyl-1-heptene, butadiene, isoprene, chloroprene, piperylene, 2,3-dimethyl-1,3-butadiene, 1,3-pentadiene, and the like. These homopolymers and copolymers of ethylene are referred to herein as ethylene polymers and it is to be understood that the term includes copolymers as well as homopolymers. These polymers have recently come into prominence and can be prepared by the method of Hogan et al. as disclosed in application having Serial No. 476,306, filed December 20, 1954, or by organo-metal catalysts, one particular type of which is disclosed in Belgian Patent 533,362, issued to Karl Ziegler, November 16, 1954.

The method of Hogan et al. is particularly applicable to 1-olefins having a maximum of 8 carbon atoms per molecule and no branching nearer the double bond than the four position, however, other olefin monomers can be polymerized by the process. According to that process, the olefin is polymerized at a temperature in the range of 100 to 500° F. in the presence of 0.1 to at least 10 weight percent chromium as chromium oxide, including a substantial proportion of hexavalent chromium, associated with at least one porous oxide selected from the group consisting of silica, alumina, zirconia, and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature treatment under non-reducing conditions and preferably with an oxidizing gas. The polymerization is preferably carried out in the liquid phase such as in solution in a hydrocarbon solvent, especially a paraffin or naphthene which is liquid under the polymerization conditions of pressure and temperature. The product of polymerizing ethylene alone or with minor amounts of such copolymerizable monomers as described when prepared by this described method will have the desired crystallinity and density for the present invention.

Similarly, polymers of ethylene of the required properties can be produced with certain organo-metal catalysts, one particular system being disclosed in the aforementioned Belgian patent. This latter patent discloses the polymerization of olefins in the presence of triethylaluminum plus titanium tetrachloride, mixtures of ethylaluminum halide with titanium tetrochloride, and the like. However, it should be understood that the starting polymer can be obtained by any source so long as it meets with the requirement of density and crystallinity.

Two methods suitable for the practice of the invention will now be described.

One method for chlorosulfonation of the ethylene polymer comprises dissolving the ethylene polymer in carbon tetrachloride under pressure at a temperature above 110° C. but usually not exceeding 130° C. Sufficient pressure is applied to maintain the solvent in liquid phase at the temperature employed. Chlorine is then introduced, while the mixture is agitated, until a product is obtained which is soluble in the solvent at atmospheric pressure. Generally at least 15 weight percent chlorine is required to produce a material which is soluble in carbon tetrachloride at 50 to 60° C. The temperature is then lowered to the 50–60° C. range, the pressure released, and sulfur dioxide and chlorine are introduced, generally simultaneously to give a product containing between 10 and 40 weight percent chlorine and 0.4 to 3 weight percent sulfur. While it is preferred to carry out the first step of the process at superatmospheric pressure and the second step at atmospheric pressure, the entire reaction can be carried out above 110° C. under pressure if desired. Temperature for the second step, when operating at atmospheric pressure, is generally in the range between 25 and 60° C. It is also possible when the entire reaction is to be carried out at the higher temperature and pressure to simultaneously introduce the sulfur dioxide and chlorine as a single step operation. Sulfonyl chloride can also be used as the chlorosulfonating agent. However, when high chlorine content is desired, additional chlorine can be employed. When using the two step process of this invention, chlorine can be conveniently used in the first step and sulfonyl chloride in the second step.

As a second method for the chlorosulfonation of the highly crystalline, high density ethylene polymer comprises dissolving the polymer in a high boiling solvent such as tetrachloroethane or hexachloroethane at a temperature between the range of 110 to 130° C., agitating the mixture, and introducing chlorine until a product containing 15 weight percent chlorine is obtained. This step of the process is usually operated in a solution which contains the ethylene polymer in a concentration between 10 and 50 weight percent. It is an object of this step of the process to provide a product which is soluble in solvents such as carbon tetrachloride, chloroform, dichloroethane, trichloroethane, ethylidene chloride, and the like. The reaction mixture from the first step of this process is recovered from the high boiling solvent by pouring the reaction mixture into boiling water or into an alcohol such as methanol, ethanol or isopropanol. The product is dried and then dissolved in a low boiling solvent such as carbon tetrachloride at 25 to 60° C. as about 3 to 5 weight percent solution. Chlorine and sulfur dioxide are introduced, generally simultaneously, to give a product containing between 10 and 40 weight percent chlorine and 0.4 to 3 weight percent sulfur. The entire process can be carried out in the high boiling solvent, however, this method is not preferred since separation of the product from the high boiling solvent is more difficult than it is from the low boiling solvents.

EXAMPLE I

A series of runs was made to demonstrate the superior properties of the product of this invention over those of chlorosulfonated polymers prepared by conventional methods.

Ethylene was polymerized by the method of Hogan et al. using a chromium oxide-silica-alumina catalyst to give a product having a molecular weight of 46,100 (as determined by the Staudinger method), a density of 0.959, and a melting point of 245±3° F. Two hundred grams of this polymer was dissolved in 3500 cc. of tetrachloroethane at 110 to 115° C. and 150 grams of chlorine was added while the mixture was irradiated with ultra-violet light. The mixture was cooled to 90 to 100° C. and an additional 150 grams of chlorine was introduced simultaneously with 30 grams of sulfur dioxide. Irradiation with ultraviolet light was continued throughout the reaction. At the end of the reaction period, 200 cc. of water was added and the produced coagulated by pouring the reactor contents into isopropyl alcohol. The resulting product was filtered and the coagulated polymer was washed with isopropyl alcohol and dried overnight in a vacuum oven at 50° C. and further at 70° C. for 4 hours. Analysis for chlorine and sulfur gave the following results: chlorine, weight percent, 29.5; sulfur, weight percent 1.85.

Two hundred grams of polyethylene prepared by conventional high pressure methods and having a molecular weight of approximately 20,000 was dissolved in carbon tetrachloride and the mixture was irradiated with ultraviolet light while 75 grams of chlorine was introduced. Irradiation was continued while 20 grams of sulfur dioxide was introduced simultaneously with 100 grams of chlorine. At the end of the reaction period, 200 grams of water was added and the mixture stirred for two hours after which it was poured into isopropyl alcohol to coagulate the product. The product was separated and washed with isopropyl alcohol and dried in a vacuum oven overnight at 50° C. Analysis for chlorine and sulfur gave the following results: chlorine, weight percent, 28; sulfur, weight percent, 1.9.

A sample of commercially chlorosulfonated polyethylene was obtained. This commercial sample was a chlorosulfonated product of a polyethylene prepared by the prior art high temperature method. The commercial sample contained 27.5 weight percent chlorine and 1.5 weight percent sulfur. This material in uncompounded condition had a tensile of 125 p.s.i. and an elongation at break of 2100 percent.

Each of the above three products were compounded according to the following recipe:

|  | Parts by Weight | |
|---|---|---|
|  | A | B |
| Chlorosulfonated polymer | 100 | 100 |
| Hydrogenated Rosin | 2.5 |  |
| Wood Rosin |  | 10 |
| Precipitated calcium carbonate | 80 |  |
| Carbon black |  | 40 |
| Magnesium oxide | 20 |  |
| Litharge |  | 40 |
| 2-Mercaptobenzothiazole |  | 3 |
| Dipentamethylenethiuram tetrasulfide | 1 |  |

Each of the compounded stocks was cured 30 minutes at 320° F. and certain physical properties were determined. The following results were obtained:

RECIPE A

| Chlorosulfonated Material | Compression set | 80° F. | | 200° F. Maximum Tensile, p.s.i. | Resilience, Percent | Shore Hardness | | Swell [1] Percent 14 days at 70° C. | Ozone Resistance Rating [2] |
|---|---|---|---|---|---|---|---|---|---|
|  |  | Tensile, p.s.i. | Elongation, Percent |  |  | Original | 7 days |  |  |
| Invention Product | 13.7 | 3,170 | 200 | 1,680 | 65.0 | 87.5 | 89.5 | 19.2 | 0 |
| Conventional Product | 24.5 | 3,180 | 200 | 1,490 |  | 83.5 | 86 | 21.8 | 0 |
| Commercial Product | 28.5 | 2,680 | 200 | 1,200 | 63.9 | 79.5 | 82.2 | 26.6 | 0 |

RECIPE B

| Invention Product | 12.4 | 4,110 | 175 | 1,500 | 44.7 | 91 | 91 | 20.3 | 0 |
| Conventional Product | 19.5 | 2,000 | 150 | 1,150 |  | 88 | 87 | 28.1 | 0 |
| Commercial Product | 19.4 | 3,320 | 200 | 1,250 | 56.0 | 81.5 | 86.5 | 34.9 | 0 |

[1] Swelling test made in SAE 10 heavy duty motor oil.  [2] A rating of 0 indicates no cracking.

From the above data, it can be seen that the product of this invention has improved compression set and excellent tensile strength at normal and elevated temperature when compounded and vulcanized and is much superior to the other materials at 200° F. The other properties were comparable with the conventional materials.

EXAMPLE II

Additional runs were made to determine the effect of orientation on tensile strength and to determine the properties in a different compounded stock.

Ethylene was polymerized in a manner similar to that described in Example I to a polymer having a molecular weight of 48,100 (determined by viscosity), a density of 0.960, a melting point of 236±2° F. and a crystallinity of over 90 percent.

One hundred thirteen grams of the polymer was dissolved in 3 liters of tetrachloroethane at 105° C. and 108 grams of chlorine and 15 grams of sulfur dioxide were added simultaneously while the mixture was irradiated with ultraviolet light. The addition of chlorine and sulfur dioxide required approximately one hour. At the end of this period 500 cc. of water was added, the mixture cooled with an ice bath, and then poured into isopropyl alcohol. The product coagulated and was washed with additional isopropyl alcohol after which it was dried. Analysis showed the chlorine content to be 17.0 weight percent and the sulfur content to be 1.27 weight percent.

Two portions of the chlorosulfonated ethylene polymer were compounded in accordance with the following recipes:

|  | Parts by Weight | |
|---|---|---|
|  | A | B |
| Chlorosulfonated polymer | 40 | 60 |
| Hydrogenated Rosin | 1 | 1.5 |
| Calcium Carbonate | 32 |  |
| Magnesium oxide | 8 | 12 |
| Dipentamethylenethiuram tetrasulfide | 0.4 | 0.6 |

The compounded stocks were cured at 300° F. for 30 minutes. Elongation and tensile strengths were determined for each stock. Measurements were made on an Instron tester using a crosshead speed of 20 inches per minute. Each of the values given below represents an average of two tests.

|  | A | B |
|---|---|---|
| Elongation, percent | 80 | 255 |
| Tensile, p.s.i. | 1,660 | 1,300 |

EXAMPLE III

Ethylene was prepared in a similar manner as in the preceeding examples according to the method of Hogan et al. and the product had the following properties:

Ash, wt. percent _____ 0.52
Volatiles, wt. percent _____ 0.48
Molecular weight _____ 48,100
Density, gm./cc. _____ 0.960
Melting point, ° F _____ 246±2

One hundred grams of the polymer was dissolved in two liters of tetrachloroethane at 120° C. and 130 grams of chlorine plus 20 grams of sulfur dioxide were added simultaneously while the mixture was irradiated with ultraviolet light. The addition of chlorine and sulfur dioxide required approximately two hours. The temperature was maintained at 115–120° C. during this period. The mixture was then cooled to 80° C. and poured into isopropyl alcohol thereby coagulating the polymer. The product was washed with additional alcohol and dried. The chlorosulfonated material had a chlorine content of 16.4 weight percent and a sulfur content of 0.69 weight percent.

A portion of the raw polymer was compression molded at 300° F. for 5 minutes. This product had a tensile strength of 2102 p.s.i. and an elongation of 738 percent. This molded product was cold drawn at the rate of two inches per minute to produce orientation. Tensile strength of the oriented material was 17,800 p.s.i. (tensile specimen pulled at the rate of 12 inches per minute).

A second portion of the chlorosulfonated polymer was compounded using the following recipe:

| | Parts by weight |
|---|---|
| Chlorosulfonated polymer | 60 |
| Hydrogenated rosin | 1.5 |
| Magnesium oxide | 12 |
| Dipentamethylenethiuram tetrasulfide | 0.6 |

The compounded stock was cured 30 minutes at 300° F. It had an elongation of 412 percent and a tensile strength of 2260 p.s.i.

EXAMPLE IV

A run was made to show the operability of the method on an ethylene copolymer and the physical properties compared with the commercial chlorosulfonated ethylene polymer of Example I. The copolymer used was a 50–50 blend of a 85/15 ethylene-propylene copolymer and a 93.5/6.5 ethylene-propylene copolymer both copolymers having been prepared by the process of Hogan et al. and being insoluble in carbon tetrachloride at refluxing temperature or lower.

Two hundred grams of this polymer blend were dissolved in tetrachloroethane at 105–110° C. and into this solution were passed simultaneously 200 grams of chlorine and 30 grams of sulfur dioxide, the system being maintained at 105–110° C. and under an ultraviolet source. The addition of chlorine and $SO_2$ was completed in three hours, after which the reaction mixture was cooled to about 70–80° C. and then 200 cc. of water added. The chlorosulfonated polymer was coagulated by pouring into isopropyl alcohol after which it was separated and washed with additional isopropyl alcohol and then dried at 60° C. in a vacuum oven. A yield of 222 grams of product containing 16.1 percent chlorine and 0.59 percent sulfur was obtained.

This product was redissolved in 3.3 liters of carbon tetrachloride at 60° C. at which temperature the system was maintained during the addition of 100 grams of chlorine and 20 grams of sulfur dioxide for a period of 3 hours and under ultraviolet light. The product was recovered as before. The yield was 250 grams with a chlorine content of 26.7 percent and a sulfur content of 1.08 percent.

A portion of the first product was compounded according to the following recipe and the physical properties compared to the commercial chlorosulfonated polyethylene of Example I.

| | Parts by weight |
|---|---|
| Chlorosulfonted polymer | 100 |
| Hydrogenated resin | 2.5 |
| Calcium carbonate | 80 |
| Calcined magnesium | 20 |
| Dipentamethylenethiuram tetrasulfide | 1 |

The data on the physical properties are tabulated below.

| Chlorosulfonated Polymer | Minutes Cure at 320° F. | Compression Set, percent | 300% Modulus, p.s.i. | Tensile 80° F., p.s.i. | Tensile 200° F., p.s.i. | Elongation, percent | Resilience, percent | Shore Hardness | Swell[1] percent | Ozone Resistance[2] |
|---|---|---|---|---|---|---|---|---|---|---|
| Invention | 20 | | | 3,200 | | 280 | | | | |
| | 20 | 13.3 | 3,180 | 3,250 | 1,620 | 310 | 68.0 | 87 | 33.4 | 0 |
| | 34 | | | 3,150 | | 220 | | | | |
| | 75 | | | 3,250 | | 265 | | | | |
| Commercial | 20 | | | 2,300 | | 200 | | | | |
| | 30 | 28.5 | | 2,800 | 1,390 | 180 | 62.3 | 79 | 26.3 | 0 |
| | 45 | | | 2,870 | | 155 | | | | |
| | 75 | | | 2,870 | | 200 | | | | |

[1] 14 days at 158° F in SAE 10 oil.
[2] 0 equals no cracking.

| Chlorosulfonated Polymer | Oven aged 24 hours at 212° F. | | | |
|---|---|---|---|---|
| | Minutes Cure at 320° F. | Tensiles p.s.i. | Elongation percent | Resilience, percent |
| Invention | 20 | 4,060 | 270 | |
| | 30 | 3,310 | 240 | 69.9 |
| | 45 | 3,200 | 210 | |
| | 75 | 3,200 | 220 | |
| Commercial | 20 | 2,800 | 150 | |
| | 30 | 2,450 | 130 | 66.2 |
| | 45 | | | |
| | 75 | 2,900 | 100 | |

From the above data, it can be seen that the blended copolymer was much superior in tensile than was the commercial chlorosulfonated material. The above data also show the improved aging properties of the chlorosulfonated products as prepared by the method of this invention.

EXAMPLE V

Several additional runs were made and physical properties compared with commercial chlorosulfonated polyethylene.

Ethylene was polymerized in a continuous process using a reactor provided with a stirrer. Polymerization was effected in the presence of a chromium oxide-silica-alumina catalyst (2.5 weight percent chromium as chromium oxide) using cyclohexane as the solvent. Polymer concentration in the reactor was 8 weight percent, catalyst concentration was 0.5 weight percent, and the residence time was 3 hours. The reaction was effected at a temperature of 280° F. and a pressure of 420 p.s.i.g. Physical properties of the product were as follows:

| | |
|---|---|
| Molecular weight[1] | 37,600 |
| Melt Index[2] | 1.37 |
| Volatiles, weight percent | 0.02 |
| Ash, weight percent | 0.001 |
| Crystallinity, percent[3] | Above 90 |

[1] Determined by Staudinger equation: Mol. wt.=2.445×inherent viscosity×10⁴. This is the method of Kemp and Peters, Ind. Eng. Chem., 35, 1108 (1943) and Dienes and Klemm, J. Applied Phys., 17, 458 (June 1946).
[2] Tentative method for measuring flow of thermoplastics by extrusion plastometer, ASTM D 1238-52T.
[3] A relative value determined by infrared measurement using a 36-carbon atom hydrocarbon as a standard.

The ethylene polymer was chlorosulfonated in three runs. Quantities of materials used in each of the runs were as follows:

| | A | B | C |
|---|---|---|---|
| Ethylene polymer g | 200 | 200 | 200 |
| Tetrachloroethane l | 3.5 | 3.5 | 3.5 |
| $SO_2$ | 40 | 40 | 40 |
| $Cl_2$ | 150 | 200 | 250 |

The polymer was dissolved in the tetrachloroethane at 115° C. and the temperatures were maintained at 110 to 115° C. throughout the reaction. Chlorine and sulfur dioxide was introduced simultaneously into the polymer solution while the mixture was stirred and irradiated with ultraviolet light. All of the sulfur dioxide was added with the addition of 100 grams of chlorine and addition of chlorine was continued until the desired amount had been introduced. Rate of addition of chlorine was approximately 50 grams per hour. After the addition of 200 cc. of water, the product was coagulated by pouring the reaction mixture into isopropyl alcohol. It was filtered, washed with isopropyl alcohol, and dried in a vacuum oven at 60° C. for 24 hours.

The three samples of chlorosulfonated ethylene polymer and two samples of commercial chlorosulfonated polyethylene (Hypalon) were compounded in accordance with the following recipe.

| | Parts by weight |
|---|---|
| Chlorosulfonated polymer | 100 |
| Hydrogenated rosin | 2.5 |
| Chemically precipitated calcium carbonate | 80 |
| Calcined MgO | 20 |
| Dipentamethylenethiuram tetrasulfide | 1 |

The compounded stocks were milled, cured 30 minutes at 307° F., and physical properties determined. Physical properties were also determined on small slabs which were molded from the uncompounded polymers. The samples were placed in a cold mold, then heated to 250° F. without pressure and held at 250° F. under pressure for 3–5 minutes, and finally cooled to 80° F. under pressure. Results of all tests were as follows:

| | Chlorosulfonated Ethylene Polymers | | | Commercial | |
|---|---|---|---|---|---|
| | A | B | C | 1 | 2[1] |
| Chlorine, wt. percent | 21.5 | 27.7 | 28.8 | 27.0 | 27.0 |
| Sulfur, wt. percent | 1.7 | 0.51 | 1.2 | 1.5 | 1.5 |
| MOLDED RAW POLYMERS | | | | | |
| Tensile, p.s.i. | 1,950 | 1,575 | 2,085 | 125 | 70 |
| Elongation, percent | 815 | 880 | 935 | 2,100 | 650 |
| Residual elongation, percent | 420 | 310 | 200 | 200 | 25 |
| COMPOUNDED AND CURED 30 MINUTES AT 307° F. | | | | | |
| Compression set, percent | 19.1 | 22.4 | 19.2 | 32.3 | 33.6 |
| 300 percent modulus, p.s.i. | 2,670 | 1,800 | 2,540 | | |
| Tensile, p.s.i. | 2,670 | 2,570 | 3,130 | 2,520 | 2,190 |
| Elongation, percent | 300 | 520 | 425 | 255 | 260 |
| Residual elongation, percent | 105 | 155 | 60 | 10 | 5 |
| 200° F. Maximum tensile, p.s.i. | 980 | 1,060 | 1,440 | 1,220 | 980 |
| $\Delta T$ ° F.[2] | 50.7 | 70.6 | 47.9 | 60.8 | 60.5 |
| Resilience, percent | 72.8 | 55.8 | 69.4 | 61.3 | 61.9 |
| Shore Hardness | 94 | 91 | 87.5 | 81.5 | 81.5 |
| Abrasion loss, grams | 7.40 | 12.74 | 6.76 | 10.42 | 11.52 |
| Freeze point, C. | −28 | −28 | −28 | −21 | −21 |
| Ozone Resistance[3] | 0 | 0 | 0 | 0 | 0 |
| 70/30 Isooctane/toluene: | | | | | |
| Swell, percent | 123.6 | 127.0 | 92.5 | 92.8 | 93.6 |
| Extracted, percent[4] | 4.4 | 5.5 | 3.6 | 2.6 | 2.4 |
| SAE 10 heavy duty motor oil: | | | | | |
| Swell, percent[5] | 53.9 | 58.0 | 32.5 | 28.4 | 26.0 |
| OVEN AGED 24 HOURS AT 212° F. | | | | | |
| 300 percent modulus, p.s.i. | | 1,930 | 2,500 | | |
| Tensile, p.s.i. | 2,520 | 2,700 | 3,225 | 2,580 | 2,320 |
| Elongation, percent | 250 | 490 | 430 | 260 | 210 |
| $\Delta T$ F.[2] | 40.9 | 61.9 | 44.9 | 45.3 | 50.7 |
| Resilience, percent | 72.6 | 70.8 | 71.7 | 66.3 | 65.7 |
| Shore hardness | 97 | 92.5 | 91 | 87.5 | 83 |
| Abrasion loss, grams | 10.12 | 15.44 | 10.24 | 12.68 | 16.20 |

[1] Same as 1 chemically but of improved processing characteristics and lower viscosity.
[2] Samples preheated 15 minutes at 212° F. to soften.
[3] Relative rating at 14 days: 0=no cracks; 10=many large cracks.
[4] Two days at 158° F.  [5] Fourteen days at 158° F.

Here again it is shown that these polymers which are not susceptible to chlorosulfonation by the prior art methods can be chlorosulfonated by the method of this invention to give products equal to or better than the prior art chlorosulfonated polyethylene.

EXAMPLE VI

An additional run was made wherein a polyethylene of high crystallinity same as Example II as prepared by the Hogan et al. method was chlorinated by the prior art method as follows. Two hundred grams of polyethylene was added to 3.5 liters of carbon tetrachloride while the solvent was refluxing. A slurry was formed but the polyethylene was not in solution. Into the refluxing mixture was passed 40 grams of sulfur dioxide and 200 grams of chlorine over a period of three hours while irradiating the flask with ultraviolet light. At the end of the reaction period, the polyethylene was not solubilized to any appreciable extent. Data on this run are shown as B(1) in the table. A second run was made as follows: two hundred grams of polyethylene was added to 3.5 liters of carbon tetrachloride after which the system was heated to refluxing temperature. The polyethylene did not dissolve. An ultraviolet light was provided and the heat source removed. After cooling to 68° C., 100 grams of chlorine was added. Then 18 grams of sulfur dioxide and 100 grams of chlorine were added over a period of 3.5 hours. Evaluation data are shown in the table as B(2). In a third run two hundred grams of the same polyethylene was added to 3.5 liters of carbon tetrachloride after which the slurry was heated at 70° C. for one hour. The mixture was then cooled to 40° C. and ultraviolet irradiation applied under which 100 grams of chlorine was added followed by 100 grams of chlorine and sulfur dioxide added simultaneously. The temperature rose to 60° C. during the reaction but was cooled back to 50° C. The evaluation data are shown as B(3).

The reaction products of the above described processes were recovered by pouring the slurry of chlorosulfonated polymer into isopropyl alcohol, filtering, washing with additional isopropyl alcohol and drying in a vacuum oven over night.

Three runs were made utilizing a low density, substantially non-crystalline commercially prepared polyethylene. In each run 200 grams of the polyethylene was dissolved in 3.5 liters of carbon tetrachloride at 60–70° C. Chlorine and sulfur dioxide were added simultaneously under ultraviolet light at a rate wherein the temperature was maintained substantially constant. After the chlorine and sulfur dioxide had been added, 200 cc. of water was added and the mixture stirred 3 to 4 hours. The chlorosulfonated product was recovered as in the above three runs, these latter three runs differed in that in the first 40 grams $SO_2$ and 100 grams $Cl_2$ were used, in the second 30 grams of $SO_2$ and 200 grams $Cl_2$ were used and in the third 15 grams of $SO_2$ and 250 grams of $Cl_2$ were used. The evaluation data are shown as C(1), C(2) and C(3) in the table. For comparative purposes, data from previous examples are also given.

| | A[1] | B[2] | | | C[3] | | | D[4] | | |
|---|---|---|---|---|---|---|---|---|---|---|
| | | 1 | 2 | 3 | 1 | 2 | 3 | 1 | 2 | 3 |
| Chlorine, percent | 27 | 21.8 | 23.5 | 24.2 | 16.2 | 30.2 | 34.5 | 16.4 | 21.5 | 28.8 |
| Sulfur, percent | 1.5 | 0.27 | 0.53 | 1.3 | 5.0 | 2.8 | 0.57 | 0.69 | 1.7 | 1.2 |
| Tensile, p.s.i. | 125 | 3,390 | 3,240 | 2,890 | 800 | 405 | 445 | 2,102 | 1,950 | 2,085 |
| Elongation at break, percent | 2,100 | 8 | 10 | 25 | 835 | 575 | 755 | 738 | 815 | 935 |

[1] Commercial chlorosulfonated polyethylene same as Example I.
[2] Crystalline polyethylene chlorosulfonated as described above.
[3] Commercial polyethylene chlorosulfonated as described above.
[4] Invention product: (1) same as Example III; (2) same as A of Example V; (3) same as C of Example V The products of B appeared to be chlorosulfonated on the surface only and have very low elongation values. These data clearly show the advantages of the process of the present invention over the process of the prior methods especially for chlorosulfonating the highly crystalline polyethylene.

We claim:

1. A process for producing a novel chlorosulfonated polymer which comprises dissolving an ethylene polymer having a crystallinity of at least 80 percent at room temperature and a density of at least 0.96 in a halogenated solvent selected from the group consisting of carbon tetrachloride, chloroform, trichloroethane, methylene chloride, tetrachloroethane and hexachloroethane at a temperature within the range of 110 to 130° C. and at a pressure sufficient to maintain said solvent in the liquid phase, said ethylene polymer having been prepared by polymerizing monomers comprising at least 50 weight percent ethylene and the remaining monomeric material being selected from the group consisting of 1-olefins and conjugated dienes and having not more than 8 carbon atoms per molecule; introducing sufficient chlorine to the solution under catalytic conditions to form a chlorinated polymer soluble in halogenated solvents at ambient temperatures; separating said chlorinated polymer from said halogenated solvent; dissolving said separated chlorinated polymer in a halogenated solvent selected from said aforementioned group at a temperature in the range of 25 to 60° C., said halogenated solvent being different from the first selected halogenated solvent; introducing additional chlorine and sulfur dioxide to the resulting solution under catalytic conditions until the polymer has a chlorine content within the range of 10 to 40 weight percent and a sulfur content within the range of 0.3 to 4 weight percent; and thereafter recovering the chlorosulfonated polymer from solution.

2. The process of claim 1 wherein the polymer is polyethylene.

3. The process of claim 1 wherein the polymer is a copolymer of ethylene and a comonomer of up to 8 carbon atoms selected from the group consisting of 1-olefins and conjugated dienes.

4. The process of claim 3 wherein the comonomer is propylene.

5. A process for producing a novel chlorosulfonated polymer which comprises dissolving an ethylene polymer, which is insoluble in carbon tetrachloride at atmospheric pressure and at refluxing temperature, in a halogenated solvent selected from the group consisting of carbon tetrachloride, chloroform, trichloroethane, methylene chloride, tetrachloroethane and hexachloroethane at a temperature within the range of 110 to 130° C. and at a pressure sufficient to maintain said solvent in the liquid phase, said ethylene polymer having been prepared by polymerizing monomers comprising at least 50 weight percent ethylene and the remaining monomeric material being selected from the group consisting of 1-olefins and conjugated dienes and having not more than 8 carbon atoms per molecule; introducing sufficient chlorine to the solution under catalytic conditions to form a chlorinated polymer soluble in halogenated solvents at ambient temperatures; separating said chlorinated polymer from said halogenated solvent; dissolving said separated chlorinated polymer in a halogenated solvent selected from said aforementioned group at a temperature in the range of 25 to 60° C., said halogenated solvent being different from the first selected halogenated solvent; introducing additional chlorine and sulfur dioxide to the resulting solution under catalytic conditions until the polymer has a chlorine content within the range of 10 to 40 weight percent and a sulfur content within the range of 0.3 to 4 weight percent; and thereafter recovering the chlorosulfonated polymer from solution.

6. A process for producing a novel chlorosulfonated polymer which comprises dissolving a polyethylene having a crystallinity of at least 80 percent at room temperature and a density of at least 0.96 in tetrachloroethane at a temperature within the range of 110 to 130° C. and at a pressure sufficient to maintain said solvent in the liquid phase; introducing sufficient chlorine to this solution under catalytic conditions to form a chlorinated polyethylene soluble in carbon tetrachloride at ambient temperatures; coagulating said chlorinated polyethylene in solution in said tetrachloroethane; separating said coagulated chlorinated polyethylene from said tetrachloroethane; dissolving said separated chlorinated polyethylene in carbon tetrachloride at a temperature in the range of 25 to 60° C.; introducing additional chlorine and sulfur dioxide to the resulting solution under catalytic conditions until the polymer has a chlorine content within the range of 10 to 40 weight percent and a sulfur content within the range of 0.3 to 4 weight percent; and thereafter recovering the chlorosulfonated polymer from solution.

References Cited in the file of this patent

UNITED STATES PATENTS

| | | |
|---|---|---|
| 2,212,786 | McQueen | Aug. 27, 1940 |
| 2,721,189 | Anderson et al. | Oct. 18, 1955 |
| 2,726,231 | Field et al. | Dec. 6, 1955 |
| 2,762,791 | Pease et al. | Sept. 11, 1956 |
| 2,879,261 | Johnson et al. | Mar. 24, 1959 |